(12) United States Patent
Muijs et al.

(10) Patent No.: US 8,233,098 B2
(45) Date of Patent: Jul. 31, 2012

(54) GAMUT ADAPTATION

(75) Inventors: Remco Theodorus Johannes Muijs, Eindhoven (NL); Jiangtao Kuang, Sunnyvale, CA (US)

(73) Assignee: TP Vision Holding B.V., Eindhoven (NL)

( * ) Notice: Subject to any disclaimer, the term of this patent is extended or adjusted under 35 U.S.C. 154(b) by 344 days.

(21) Appl. No.: 12/515,041

(22) PCT Filed: Nov. 16, 2007

(86) PCT No.: PCT/IB2007/054677
§ 371 (c)(1),
(2), (4) Date: Jan. 6, 2010

(87) PCT Pub. No.: WO2008/062355
PCT Pub. Date: May 29, 2008

(65) Prior Publication Data
US 2010/0110312 A1 May 6, 2010

(30) Foreign Application Priority Data

Nov. 23, 2006 (EP) .................................... 06124653

(51) Int. Cl.
*H04N 9/30* (2006.01)
(52) U.S. Cl. ........ 348/802; 348/803; 348/630; 348/649; 345/590; 345/600; 382/167; 358/1.9; 358/518
(58) Field of Classification Search .................. 348/802, 348/803, 799, 630, 649; 382/166, 167; 358/1.9, 358/518, 520, 523; 345/590, 589, 600, 601
See application file for complete search history.

(56) References Cited

U.S. PATENT DOCUMENTS

| 7,167,275 | B2 * | 1/2007 | Fukasawa ...................... 358/1.9 |
| 2002/0081022 | A1 | 6/2002 | Bhaskar |
| 2006/0170940 | A1 | 8/2006 | Kang et al. |
| 2006/0244983 | A1 | 11/2006 | Zeng |

FOREIGN PATENT DOCUMENTS

| EP | 1195983 A2 | 4/2002 |
| EP | 1443456 A1 | 8/2004 |

(Continued)

OTHER PUBLICATIONS

Morovic et al: Calculating Medium and Image Gamut Boundaries for Gamut Mapping; Color Research and Application, 25, pp. 394-401, 2000.

(Continued)

*Primary Examiner* — Jefferey Harold
*Assistant Examiner* — Jean W Desir
(74) *Attorney, Agent, or Firm* — Shimokaji & Assoc., PC (57) ABSTRACT

A system (600) for performing gamut compression or gamut extension by transforming an input color (608) of an input image defined within a first gamut (102) into a reproduction color (610) of an output image for rendering by a reproduction device capable of rendering colors within a second gamut (104) different from the first gamut. The input color has an input chromaticity (C1) and an input lightness (Z-*) together forming an input point (202) in a chromaticity-lightness plane. The reproduction color has a reproduction point (210) in the chromaticity-lightness plane, wherein an absolute difference between the input lightness and the output lightness is a decreasing function of at least the chromaticity. An absolute difference between the input chromaticity and the output chromaticity is an increasing function of at least the chromaticity.

24 Claims, 8 Drawing Sheets

FOREIGN PATENT DOCUMENTS

| | | |
|---|---|---|
| EP | 0723364 A2 | 7/2007 |
| JP | 2004206853 | 9/2004 |

OTHER PUBLICATIONS

West et al: "High Brightness Direct LED Backlight for LCD-TV"; SID03 Digest, May 2003, pp. 1262-1265.

Sugiura et al: "Wide Color Gamut and High Brightness Assured by the Support of LED Backlighting in WUXGA LCD-Monitor": SID04 Digest, pp. 1230-1233.

Sugiura et al: "Six—Primary Color 23 Inch WXGA LCD Using Six-Color LED's"; SID05 Digest, May 2005, pp. 1124-1127.

Jak T Al: Spectrum Sequential LC-TV; Proc. Intl. Disp. Workshops, IDW05, Dec. 2005, vol. 12, No. 1, pp. 235-238.

Wyszecki et al: "Color Science: Concepts and Methods, Quantitative Data and Formulae", pp. 129-130, J. Wiley & Sons, Inc., New York, 1982.

* cited by examiner

GAMUT ADAPTATION

FIELD OF THE INVENTION

The invention relates to gamut adaptation, in particular gamut compression and gamut extension.

BACKGROUND OF THE INVENTION

Video signals are commonly defined in terms of a fixed set of primaries, such as those defined by the European Broadcast Union (EBU). Recently, wide-gamut displays have been developed that are capable of reproducing colors outside of the EBU-triangle, by either using more saturated primaries (e.g., using LED backlights) or by making use of more than three primaries in the backlight. See for example "High brightness direct LED-backlight for LCD-TV", by West, R. S. et al., in: SID03 Digest, pp. 1262-1265, May 2003; "Wide color gamut and high brightness assured by the support of LED backlighting in WUXGA LCD-monitor", by Sugiura, H. et al., in: SID04 Digest, pp. 1230-1233, May 2004; "Six-primary-color 23 inch WXGA LCD using six-color LEDs", by Sugiura, H. et al., in: SID05 Digest, pp. 1124-1127, May 2005; and "Spectrum Sequential LC-TV", by Jak, J. J. J. et al., in: Proc. IDW05, December 2005.

As a consequence, there exists a need for color processing algorithms with which the incoming video signal can be mapped to the reproduction gamut in such a manner that the potential of the wider color gamut of such new displays is better exploited. Similarly there exists a need for color processing algorithms with which the incoming video signal can be mapped to the reproduction gamut in the case where the input gamut comprises colors not included in the reproduction gamut. This is for example the case when rendering a video signal that is prepared for a wide-gamut display on a legacy CRT display. It is also the case when rendering video or images on small-gamut displays found in for example mobile phones and PDA's.

EP 0 723 364 A2 discloses an image enhancement method for optimizing intensity and saturation values. EP 1 443 456 A1 discloses a color image processing method including reducing saturation for a pixel at which the detected saturation is smaller than a predetermined threshold, and enhancing saturation for a pixel at which the detected saturation is greater than a predetermined threshold. However, both these methods relate to image enhancement within a same gamut and do not make use of the larger reproduction gamut available on new displays.

From color science, it is well known how signals represented on one set of primaries should be transformed to another set of primaries such that the underlying color information is preserved. Such a transformation is called a colorimetric mapping. Also, a simple and direct approach to making use of the wider color gamut is by applying no color processing at all (not even colorimetric mapping) and simply use the same drive values defined on the EBU-primaries for display.

EP 1 195 983 A2 discloses an image processing apparatus provided with a color-correction lookup table for chroma enhancement, which applies chroma-enhancement processing to a desired color point in the input image signal in an area where an output system gamut is wider than an input system gamut, and uses the color-correction lookup table for chroma enhancement according to the input image signal for performing the desired color correction. The color-correction lookup table for chroma enhancement does not perform the chroma-enhancement processing when the desired color point is close to achromatic color.

SUMMARY OF THE INVENTION

It would be advantageous to have an improved color mapping for gamut adaptation. To better address this concern, in a first aspect of the invention a system (600) is presented for performing gamut compression or gamut extension by transforming an input color (608) of an input image defined within a first gamut (102) into a reproduction color (610) of an output image for rendering by a reproduction device capable of rendering colors within a second gamut (104) different from the first gamut, the input color having an input chromaticity ($C_i$) and an input lightness ($L_i^*$) together forming an input point (202) in a chromaticity-lightness plane, the reproduction color having a reproduction chromaticity and a reproduction lightness together forming a reproduction point (210) in the chromaticity-lightness plane, wherein an absolute difference between the input lightness and the output lightness is a decreasing function of at least the chromaticity, and an absolute difference between the input chromaticity and the output chromaticity is an increasing function of at least the chromaticity.

In the case of gamut extension, the lightness is changed to increase an overall contrast of the image, and the chromaticity is changed to realize an overall chromaticity boost of the image. In the case of gamut compression, the lightness is changed to decrease an overall contrast of the image, and the chromaticity is changed to realize an overall chromaticity reduction of the image.

The dependence on the chromaticity allows high chromaticity colors to be chromaticity boosted/reduced. The chromaticity of low-chromaticity colors is largely left unchanged to avoid the reproduction colors to look unnatural. Where the chromaticity of low-chromaticity colors is not changed much, the required gamut extension/reduction of low-chromaticity colors is realized by applying a contrast enhancement/reduction. The transformation set forth makes improved use of the colors available for reproduction to enhance chromaticity and contrast while avoiding unnatural looking colors. A tradeoff is realized between two fundamental possibilities of using the colors available in the different reproduction gamut: contrast enhancement/reduction and chromaticity boost/reduction.

In an embodiment, an angle ($\theta$) between a positive chromaticity axis of the chromaticity-lightness plane and a line connecting the input point and the reproduction point is a continuous function of at least the input chromaticity.

The angle determines the ratio between an increase or decrease in lightness and an increase or decrease in chroma. For chromaticity values where the angle equals $-90$ degrees or $+90$ degrees, contrast is enhanced/reduced. For chromaticity values where the angle is strictly larger than $-90$ degrees and strictly smaller than $+90$ degrees, chromaticity is boosted. For chromaticity values where the angle is strictly larger than $+90$ degrees and strictly smaller than $+270$ degrees, chromaticity is reduced. The continuous dependence of the angle on the chromaticity ensures that both contrast enhancement and chromaticity boost are realized in a way that is perceived by the viewer as natural and pleasing. For convenience, the angle is specified here in a range of $-90$ to $+270$ degrees. The skilled person will understand that the angle may be specified using any angular range comprising a full 360 degrees circle.

In an embodiment, the angle is a monotonically increasing and continuous function of at least the input lightness. The monotonically increasing dependence of the angle on the input lightness results in a consistent contrast enhancement/ reduction. The continuity of the dependence ensures a more natural, pleasing image. For lightness values where the angle depends strictly increasingly on the lightness and the angle is in the range between −90 and +90 degrees, contrast is enhanced. For lightness values where the angle depends strictly increasingly on the lightness and the angle is in the range between +90 degrees and +270 degrees, contrast is reduced.

In an embodiment, the angle is a piecewise linear function of at least the input lightness. The piecewise linear dependence makes the transformation particularly smooth and results in a pleasing image.

In an embodiment, the second gamut comprises colors not included in the first gamut, and the reproduction chromaticity is equal to or larger than the input chromaticity. This embodiment relates to a gamut extension. If the reproduction chromaticity is equal to or larger than the input chromaticity, the angle will be in a range of −90 to +90 degrees. In an embodiment, the angle is within a range of −β to +β, where β is a predetermined positive value of at most 90 degrees.

In an embodiment, the angle varies at least piecewise linearly with the input lightness. The piecewise linear relation has been found to provide a particularly pleasing effect. It makes the dependence relatively smooth.

In an embodiment, an absolute value of the angle is a monotonically decreasing function of at least the input chromaticity. The dependence on chromaticity, by itself as well as in combination with the dependence on lightness, was found to be another enabling factor for creating pleasing images. The decreasing dependence of the absolute value of the angle on the input chromaticity means, that the chromaticity is boosted more for higher input chromaticity values, at the cost of contrast enhancement.

In an embodiment, the angle is an at least piecewise linear function of at least the input chromaticity. The piecewise linear relation has been found to provide a particularly pleasing effect. It makes the dependence relatively smooth.

In an embodiment, the angle depends on a product of a function of the chromaticity and a function of the lightness. The product of two functions can be fine-tuned relatively easily as it separates the dependence on chromaticity from the dependence on lightness. For example, the function of the lightness is a piecewise linear, increasing function in a range of −90 to 90 degrees. The function of the chromaticity is for example a piecewise linear decreasing function in a range of −1 to 1. Other arrangements are possible, for example fully linear functions or exponential or polynomial functions may be used.

In an embodiment, the angle is zero for an upper range of chromaticity values within the input gamut. This allows maximal increase of chromaticity for input colors already having a relatively large chromaticity. Where the angle is zero, the transformation is limited to chromaticity boost, and does not enhance the contrast. An angle that is zero can be realized for example by ensuring that one of the functions of which the angle is a product is zero.

In an embodiment, an input chromaticity value exists for which it holds that the angle is zero for a predetermined lightness value, the angle is negative for input lightness values below the predetermined lightness value, and the angle is positive for input lightness values above the predetermined lightness value.

This allows to enhance the overall contrast of the image while keeping the lightness unchanged if it equals the predefined lightness value. For example the predetermined lightness value corresponds to 50% of full lightness.

In an embodiment, a distance between the input point and the reproduction point is an increasing function of at least the input chromaticity. The chromaticity was found to play an important role when it comes to determining the total amount of contrast enhancement/reduction and chromaticity boost/ reduction. For relatively low input chromaticity values the color should not be changed much, whereas for relatively high input chromaticity values a larger change makes the image more pleasant. An exponential dependence between the distance and the input chromaticity value provides a pleasant, smooth enhancement.

In an embodiment, the distance varies with a further distance between an intersection point of the line connecting the input point and the reproduction point with the input gamut boundary and an intersection point of that line with the reproduction gamut boundary. The further distance indicates how much room is available for contrast enhancement and/or chromaticity boost based on the angle. This room can be used by properly adapting the distance between the input color and the reproduction color to use all or a predefined subset of the available reproduction colors. In case of gamut compression, the further distance indicates the required amount of contrast reduction and/or chromaticity reduction.

In an embodiment, the input gamut is a gamut of colors that have a representation in a home television broadcast signal. The method is suited for improving the rendering of (legacy) television programs on modern displays that have a reproduction gamut comprising colors not available in the input signal.

In an embodiment, the input color has an input hue and the reproduction color has a reproduction hue, the input hue and the reproduction hue being essentially the same. It was found to be unpleasant if the hue is changed.

An embodiment comprises a color look-up table for mapping predetermined input colors to predetermined reproduction colors, and means for looking up the reproduction color corresponding to the input color in the look-up table. A look-up table is an efficient manner of implementing the transformation.

In an embodiment, the input colors and/or the reproduction colors are represented in the look-up table using an RGB coordinate space. The RGB color space is often used to represent video and image data.

An embodiment comprises transforming an input color (608) of an input image defined within a first gamut (102) into a reproduction color (610) of an output image for rendering by a reproduction device capable of rendering colors within a second gamut (104) different from the first gamut, the input color having an input chromaticity ($C_i$) and an input lightness ($L_i^*$) together forming an input point (202) in a chromaticity-lightness plane, the reproduction color having a reproduction chromaticity and a reproduction lightness together forming a reproduction point (210) in the chromaticity-lightness plane, wherein an absolute difference between the input lightness and the output lightness is a decreasing function of at least the chromaticity, and an absolute difference between the input chromaticity and the output chromaticity is an increasing function of at least the chromaticity. An embodiment comprises a computer program product comprising instructions for causing a processor to perform the method set forth.

An embodiment comprises a look-up table for mapping an input color to a reproduction color in the way set forth.

An embodiment comprises a color television set comprising
an input (95,96) for receiving an input image having colors within a first gamut (102);

a display (93) for rendering an output image, where the display is capable of rendering colors within a second gamut (104) different from the input gamut; and means (91,92) for performing gamut compression or gamut extension by transforming an input color (608) of the input image into a reproduction color (610) of the output image, the input color having an input chromaticity ($C_i$) and an input lightness ($L_i^*$) together forming an input point (202) in a chromaticity-lightness plane, the reproduction color having a reproduction chromaticity and a reproduction lightness together forming a reproduction point (210) in the chromaticity-lightness plane, wherein an absolute difference between the input lightness and the output lightness is a decreasing function of at least the chromaticity, and an absolute difference between the input chromaticity and the output chromaticity is an increasing function of at least the chromaticity.

In an embodiment, the display (93) comprises an LED backlight.

In an embodiment, the display (93) comprises means for rendering more than three primary colors.

An embodiment comprises a handheld device comprising
an input (95,96) for receiving an input image having colors within a first gamut (102);
a display (93) for rendering an output image, where the display is capable of rendering colors within a second gamut (104), where the first gamut comprises colors not included in the second gamut; and
means (91,92) for performing gamut compression by transforming an input color (608) of the input image into a reproduction color (610) of the output image, the input color having an input chromaticity ($C_i$) and an input lightness ($L_i^*$) together forming an input point (202) in a chromaticity-lightness plane, the reproduction color having a reproduction chromaticity and a reproduction lightness together forming a reproduction point (210) in the chromaticity-lightness plane, wherein an absolute difference between the input lightness and the output lightness is a decreasing function of at least the chromaticity, and an absolute difference between the input chromaticity and the output chromaticity is an increasing function of at least the chromaticity.

BRIEF DESCRIPTION OF THE DRAWINGS

These and other aspects of the invention will be further elucidated and described with reference to the drawing, in which.

DETAILED DESCRIPTION OF EMBODIMENTS

There is currently a trend towards wide-gamut displays by either using more than three primaries or by placing LED's in the backlight for television applications. Similar developments may follow shortly for mobile applications. A gamut extension algorithm can, in principle, be applied in any situation where a display is capable of reproducing colors that are outside of the gamut of the video or still image data. Many video data is available in, for example, the standard EBU gamut, and a gamut extension algorithm allows making better use of the color rendering capacities of modern displays when rendering this legacy video data.

An embodiment provides a gamut extension method for mapping a video signal to a reproduction gamut that is wider than the input gamut. This is a useful tool for new wide-gamut displays. The gamut extension method applies corrections in the CIELab color space both to the signal lightness and chroma, but does not alter the hue. In this embodiment, the ratio between the chroma and lightness corrections (the extension direction) is varied as a function of the lightness and chroma input coordinates. Contrast enhancement and saturation boosting are balanced in that for bright and dark unsaturated colors the contrast of the signal is increased and the chroma is predominantly maintained to prevent undesired coloring of achromatic pixels. For saturated pixels, on the other hand, the mapping boosts the chroma to make optimal use of the better color rendering capabilities of novel displays.

In this description, color-processing algorithms with which the colors are mapped to a reproduction gamut comprising colors not present in the input gamut will be referred to as gamut extension algorithms (in contrast to gamut compression techniques with which colors are mapped to a narrower gamut, such as for mobile displays). It will be appreciated by a skilled person that the gamut extension algorithms presented herein may be used as a basis of a gamut compression algorithm. In particular, an inverse of a gamut extension algorithm may by used as a gamut compression algorithm.

From color science, it is well known how signals represented on one set of primaries should be transformed to another set of primaries such that the underlying color information is preserved (See for example "Color science: concepts and methods, quantitative data and formulae ($2^{nd}$ ed.)" by G. Wyszecki et al., J. Wiley & Sons, Inc., New York, 1982):

$$(RGB)_2 = inv(A_2)*A_1*(RGB)_1, \qquad (1)$$

where $A_1$ and $A_2$ are 3×3 matrices of which the columns contain the tri-stimulus values (X,Y,Z) of the input and reproduction sets of primaries, respectively, and $RGB_1$ and $RGB_2$ represent the drive values of the video on the input set and reproduction set of primaries, respectively. Such tri-stimulus values (X,Y,Z) are known from the CIE XYZ color space definition (where CIE stands for Commission Internationale de l'Eclairage). When the input gamut is entirely enclosed by the wider reproduction gamut, the output drive values $RGB_2$ will always remain in the valid range of [0,255] and no clipping will occur. However, true-color mapping merely maintains all the color information, but does not make use of the more saturated colors that new displays may be capable of reproducing.

Figure 1:
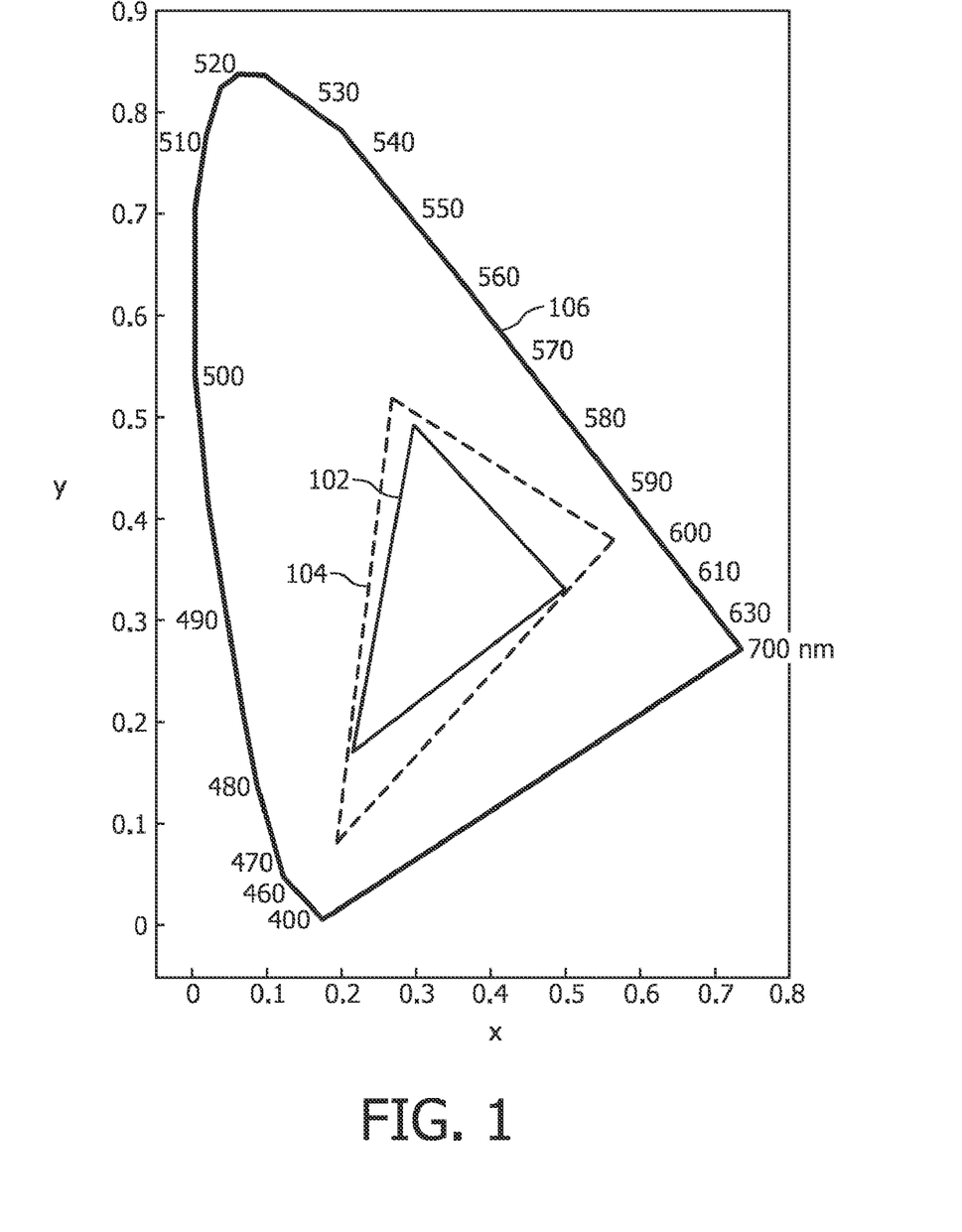
FIG. 1 illustrates boundaries of an input gamut and a reproduction gamut in a CIExy chromaticity diagram.

A simple and direct approach to making use of the wider color gamut is by applying no color processing at all (not even colorimetric mapping) and simply use the same drive vales defined on the EBU-primaries for display. This simple approach may provide satisfactory results when the input and reproduction gamuts are similarly shaped, but in other cases it may provide very poor color rendering, particularly in the presence of hue differences between the input and reproduction primaries, as illustrated in FIG. 1. FIG. 1 shows an exemplary CIExy chromaticity plot with axes x and y. The plot shows an input gamut 102 and a reproduction gamut 104. These gamuts are subsets of the gamut 106 that represents the colors, which can be seen by a human observer.

One of the possible aims of a color-processing algorithm is to modify perceptual image attributes, such as lightness, chroma, hue or saturation in such a manner that the appearance of the displayed image is pleasant to the viewer. Preferably, color-processing components are implemented in a perceptually meaningful color space, such as CIELAB or CIELCh, in which these attributes can be assessed and modified directly. After having researched the color characteristics of the color-processing components, they may be optimized by implementing them in another color space such as an RGB color space. Furthermore, to ensure that an extension method generates only colors that can be displayed by the target reproduction device, information about input and reproduction gamut boundaries in terms of coordinates in the selected color space can be used. As known in the art, this information can be obtained by (1) sampling the hull of a RGB data cube, (2) transforming these data points to CIELab or CIELCh coordinates using the color points of the input and reproduction sets of primaries and (3) implementing a suitable interpolation routine to compute the gamut boundary between the sampled locations. Both the transformation to CIELAB coordinates (or coordinates in other color spaces) and the computation of gamut boundaries in these and other color spaces are well documented and will not be discussed in detail in this description.

In an embodiment, a gamut extension method comprises the following four steps:

1. Transformation of RGB input drive values to CIELCh coordinates lightness, chroma and hue (L, C, H).
2. Identification of relevant input and output gamut boundaries in LCh-coordinates
3. Adaptive, hue-preserving extension of lightness and chroma signals, taking into account the input and reproduction gamut boundaries.
4. Inverse transformation of the extended LCh-signal to RGB-drive values for display.

These four steps may be performed for a plurality of colors and the result may be stored in a look-up table for efficient conversion of video and image data. Alternatively, the four steps may be applied to the video and image data directly. This embodiment preserves the image hue, thus reducing the problem to a 2D mapping procedure in lightness and chroma coordinates.

Figure 2:
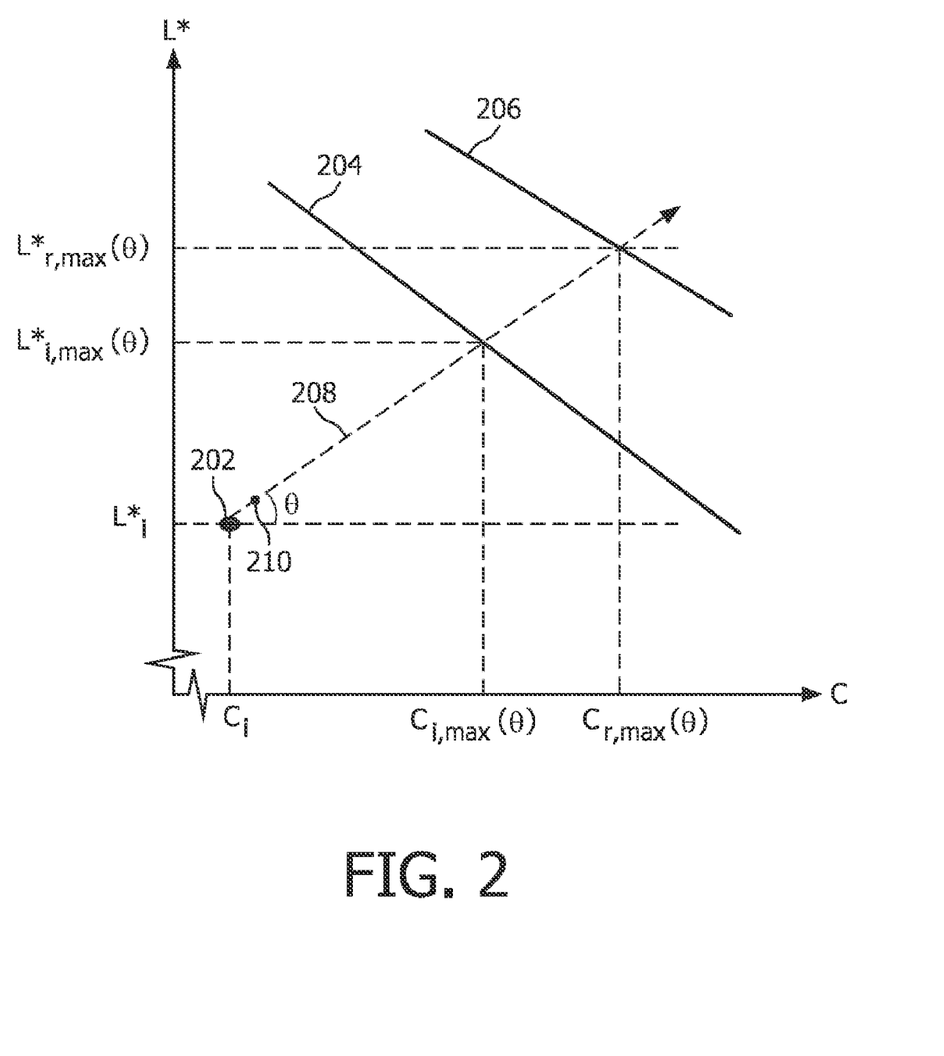
FIG. 2 illustrates a definition of a mapping angle Θ in a chromaticity-lightness plane.

FIG. 2 shows a plot of an input color 202 in a chroma-lightness plane. The plot shows a chromaticity axis C and a lightness axis L*. The figure shows an input gamut boundary 204 and an output gamut boundary 206. An extension direction 208 is also shown. Knowledge of the input and reproduction gamut boundaries may be employed in a gamut extension algorithm. Mapping a pixel with lightness and chroma coordinates $L^*_i$ and $C_i$, respectively, first involves computing the extension direction θ and subsequently the computation of the intersection points with the input gamut boundary ($L^*_{i,max}$, $C_{i,max}$) and the reproduction gamut boundary ($L^*_{r,max}$, $C_{r,max}$) in that particular extension direction. These gamut boundary coordinates, in turn, can be used to design appropriate (normalized) transfer curves used to determine an appropriate amount of extension. This procedure prevents pixels being mapped outside of the reproduction gamut.

Gamut extension of a color may be characterized as a combination of an extension direction in which the color is extended, and an extension type, which determines an amount of extension along the extension direction. The extension direction can be expressed in terms of an angle θ which indicates the extension direction in a chroma-lightness plane as illustrated in FIG. 2.

In an embodiment, chroma boosting is applied primarily to saturated input colors, whereas the chroma of unsaturated colors is mostly preserved. One of the reasons for this is that natural objects commonly exhibit low to moderate saturation and boosting of their chromaticity easily results in an unnatural appearance of the image. On the other hand, input colors that have high saturation (e.g. artificial objects such as cars, plastic toys, cartoons) may be boosted to obtain a more pleasing image. Achromatic colors can benefit from the extra available gamut volume by changing the lightness to effectively allow the contrast to be enhanced. In short, a contrast enhancing mapping in the lightness direction for low-saturation colors is combined with a chroma boost for high-saturation colors.

This can be achieved by computing the extension angle θ as a function of both lightness and chroma coordinates. For example:

$$\theta = F(L^*) \cdot F(C), \quad (1)$$

where $F(L^*)$ and $F(C)$ represent lightness- and chroma-dependent modulations of the extension angle. The extension direction angle θ is represented in degrees, and is the angle between the extension direction and the chromaticity axis in the chromaticity-lightness plane. For example, F may be defined as:

$$F(L^*) = \begin{cases} 90 \cdot \frac{(L^* - L^*_{mid})}{(100 - L^*_{mid})} & \text{for } (L^* - L^*_{mid}) > 0 \\ 90 \cdot \frac{(L^* - L^*_{mid})}{(L^*_{mid})} & \text{for } (L^* - L^*_{mid}) \le 0 \end{cases} \quad (2)$$

$$F(C) = \begin{cases} 1 - \frac{C}{C_{TH}} & \text{for } C \le C_{TH} \\ 0 & \text{for } C > C_{TH}. \end{cases} \quad (3)$$

In the above equations, L* and C are the input lightness and chroma coordinates, respectively, and $L^*_{mid}$ and $C_{TH}$ are user-defined constants. According to equation 2, the extension angle θ is modulated from −90 degrees to +90 degrees, amounting to 0 degrees (chroma extension) for $L^* = L^*_{mid}$ and 90 degrees for L* close to 0 and 100. According to equation 3, the angle linearly decreases with increasing chroma for chromaticities below $C_{TH}$, setting it to 0 degrees for chromaticities higher than $C_{TH}$.

Figure 3:
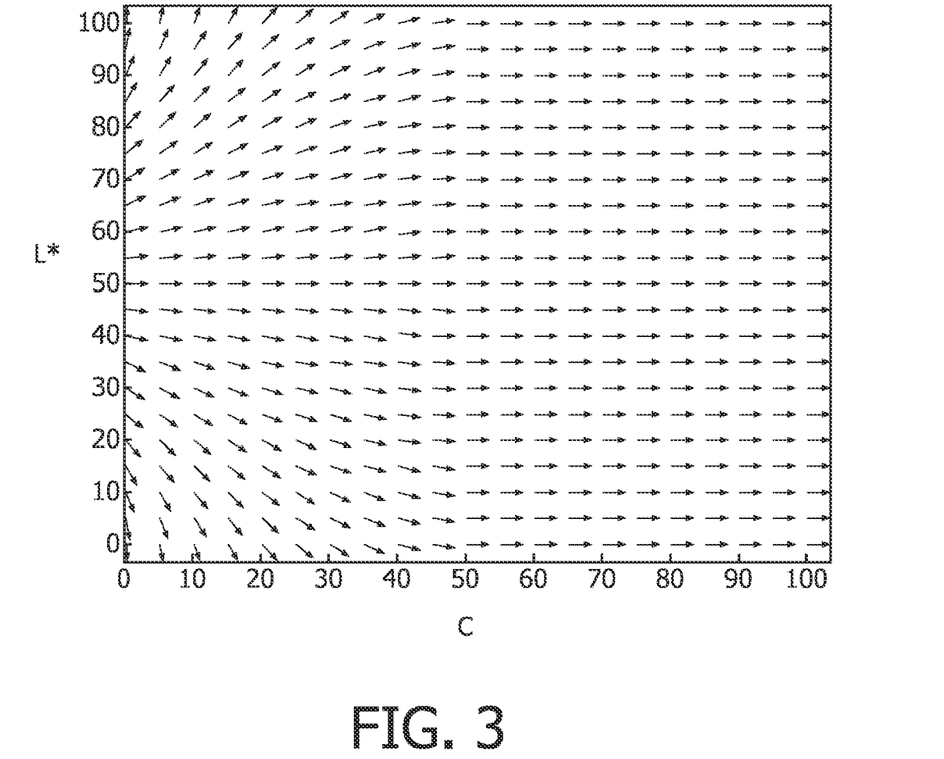
FIG. 3 illustrates extension directions in a chromaticity-lightness plane.

FIG. 3 illustrates the functional behavior of equations (1)-(3) in the exemplary case that $L^*_{mid}=50$ and $C_{TH}=50$. Note that this Figure merely illustrates the extension direction and that the vectors have all been set to a fixed length. In practice, the extension type determines the length of the vectors (see below). FIG. 3 illustrates that the mapping of achromatic colors (low chroma coordinates) varies predominantly in the lightness direction, effectively representing contrast enhancement. With increasing chroma, the pixels are mapped increasingly in the chroma direction thus enhancing their saturation. In the case of gamut compression, the arrows of FIG. 3 would point to their respective opposite directions. They would point towards the L*-axis rather than away from it. They would represent chromaticity decrease rather than chromaticity increase and contrast reduction rather than contrast enhancement.

FIG. 2 illustrates that, for a given input color point 202, the intersection point of the extension direction line 208 with the input gamut boundary 204 can be found. Similarly, the intersection point of the extension direction line 208 with the reproduction gamut boundary 206 can be found. Ways to determine the gamut boundary points in the given extension direction are known in the art, see for example "Calculating medium and image gamut boundaries for gamut mapping" by J. Morovic et al., in: Col. Res. Appl., 25, pp. 394-401, 2000.

Figure 4:
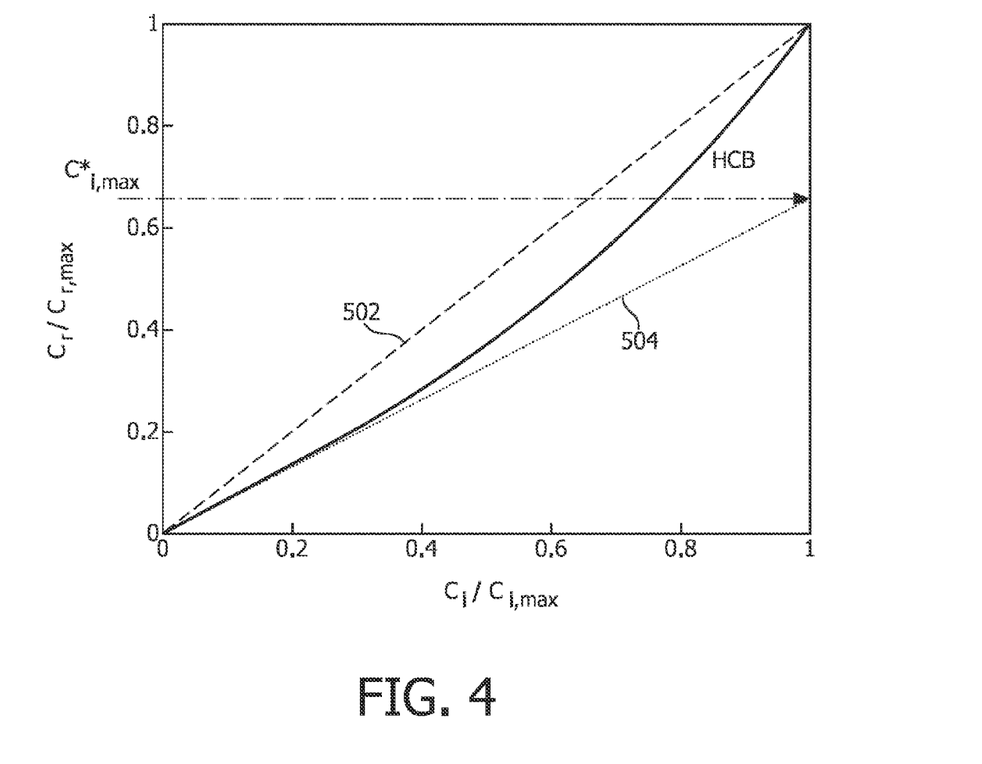
FIG. 4 illustrates an extension type.

Once the gamut boundary points in the desired extension direction have been established, a type of extension can be expressed in terms of a transfer curve that is normalized by the distance to the respective gamut boundaries. Saturation boosting of low-chroma natural colors and colorization of grey pixels can be further prevented by designing this transfer curve in such a manner that low-chroma colors are enhanced less than high-chroma (saturated) colors. This can, for example, be achieved using exponential gain functions for the chroma and lightness coordinates:

$$C_r = \left(1 - \left(\frac{C_i}{C_{i,max}}\right)^\gamma\right)C_i + \left(\frac{C_i}{C_{i,max}}\right)^\gamma \frac{C_{r,max}}{C_{i,max}}C_i, \quad (4)$$

$$L_r^* = L_i^* + (C_r - C_i)\tan\theta$$

$$H_r = H_i$$

where $L^*_i$, $C_i$ and $H_i$ again denote the input lightness, chroma and hue coordinates, $L^*_r$, $C_r$ and $H_r$ represent the reproduction (output) LCH coordinates and $L^*_{i,max}$, $C_{i,max}$, $L^*_{r,max}$ and $C^*_{r,max}$ correspond to the input gamut boundary coordinates and reproduction gamut boundary coordinates, respectively (see FIG. 2). Because changes in hue are often highly annoying to the viewer, the proposed color-mapping algorithm preserves the hue of the pixels. FIG. 4 illustrates the type of extension defined by equation (4). This Figure illustrates that equation (4) effectively represents an adaptive mixing between linear extension (the first terms on the right hand-side of equation (4)) and colorimetric (no extension) mapping (the second term on the right hand side of equation (4)). As a result, natural unsaturated (low-chroma) colors are extended over a smaller distance, whereas saturated (high-chroma) colors are extended over a longer distance. Similar effects can be achieved using alternative transfer curves, such as piecewise linear or polynomial functions.

Figure 5:
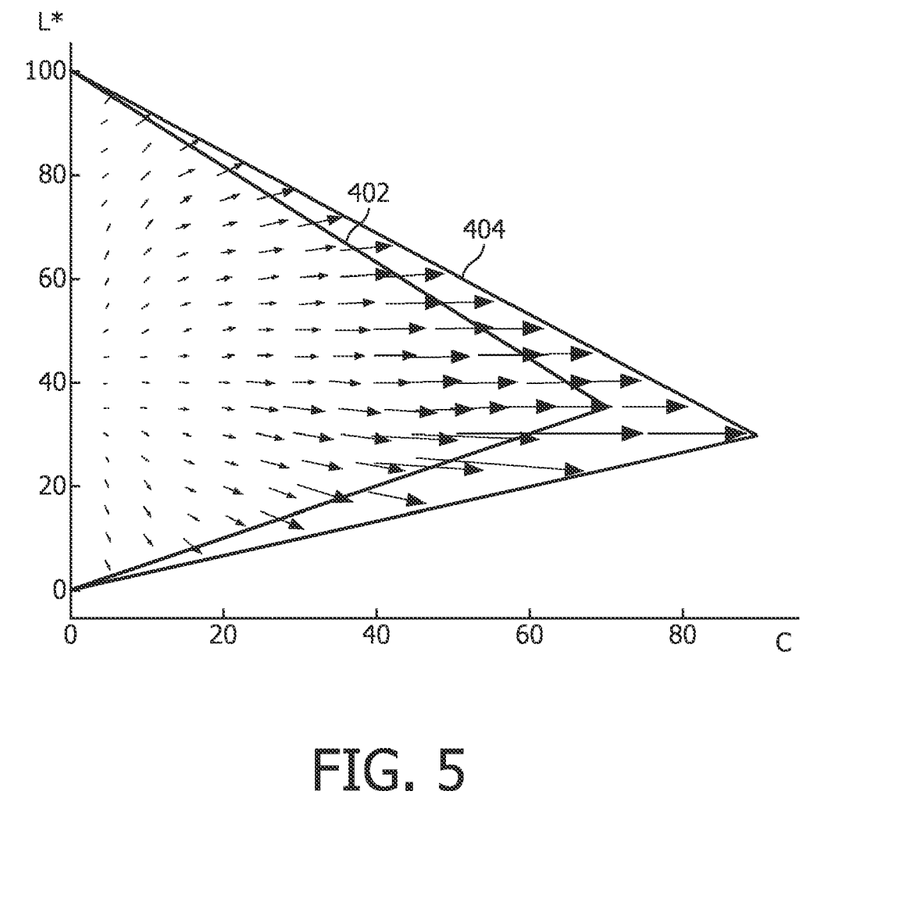
FIG. 5 illustrates a result of extension directions and an extension type.

FIG. 5 illustrates a combined effect of the extension direction and the extension type by means of arrows. The figure shows the exemplary case where $L^*_{mid}=50$, $C_{TH}=50$, and $\gamma=2$. The direction of each arrow corresponds to the extension direction, and the length of each arrow corresponds to the distance over which colors are mapped according to the extension type. The figure also shows the input gamut boundary 402 (where $C_i/C_{i,max}=1$) and the reproduction gamut boundary 404 (where $C_i/C_{r,max}=1$). In this example, the input and reproduction gamut boundaries coincide where C=0. Because of this and because of the extension direction near the L* axis, there is no room available for the colors to be stretched, such that little or no extension occurs in this region. The figure also shows increasing extension amounts for coordinates closer to the input gamut boundary 402. The extension amounts are also larger where the distance between the reproduction gamut boundary 404 and the input gamut boundary 402 along the extension direction is larger, i.e., where the headroom is larger. For $C>C_{TH}$, the extension direction $\theta=0$, which means that lightness is kept constant. This leaves the most room for increasing chroma, thus making aggressive use of more saturated primaries that may be available on the reproduction device. In other cases, where the input and reproduction gamut boundaries do not coincide where C=0, more contrast enhancement will be applied to low-chroma colors.

Figure 6:
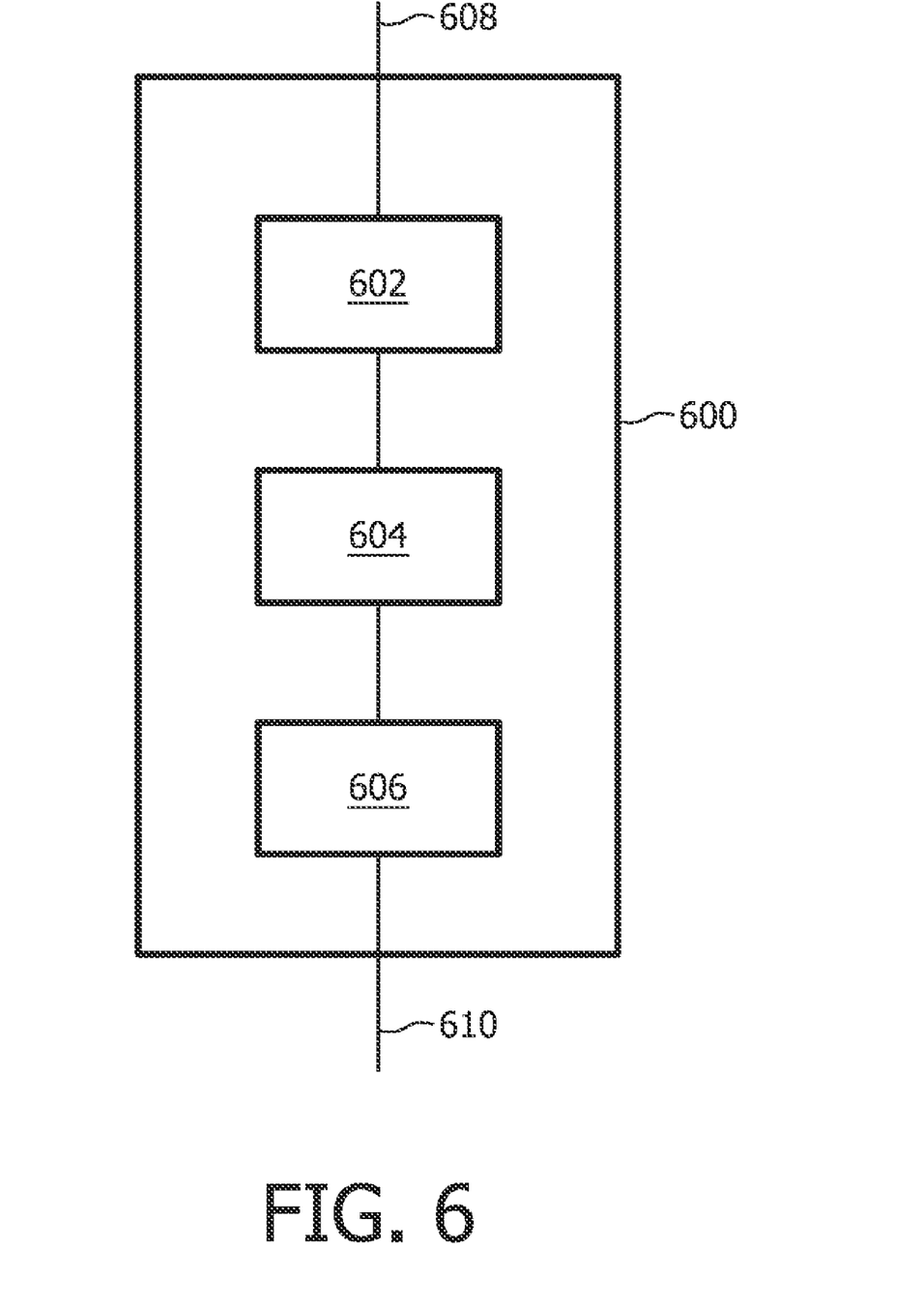
FIG. 6 illustrates a diagram of an embodiment of the invention.

An embodiment of the invention is illustrated in FIG. 6. This embodiment comprises a system 600 for transforming an input color 608 defined within a first gamut into a reproduction color 610 for rendering by a reproduction device capable of rendering colors within a second gamut. The second gamut comprises colors not included in the first gamut. The input color is provided in block 602. The input color has an input chromaticity and an input lightness together forming an input point in a chromaticity-reproduction plane. In block 606, a reproduction color is provided as an output having a reproduction chromaticity and a reproduction lightness together forming a reproduction point in the chromaticity-reproduction plane. These colors need not be physically represented in the form of a lightness, chromaticity, and/or hue, but may be represented in any available or practical coordinate system, such as an RGB coordinate system. For example, a PAL, SECAM, or NTSC input signal may be used. A digital video signal may also be used. Preferably, an output signal coordinate system is used that supports a gamut with more colors than a gamut associated with the input signal.

In block 604, a reproduction color is computed or looked up that corresponds to the input color, where an angle between a chromaticity axis of the chromaticity plane and a line connecting the input point and the reproduction point depends on the input lightness. This reproduction color is forwarded to block 606. A conversion between the input and the reproduction coordinate system may be performed simultaneously, for example by using a look-up table where the input colors and the output colors are represented in different coordinate systems. Alternatively, the input colors may be transformed in block 602 to an intermediate coordinate system, for example CIELCh coordinate system. In block 604, a gamut extension algorithm is performed using this intermediate coordinate system. The resulting color coordinates of the reproduction color are then transformed to a reproduction color coordinate system in block 606.

Figure 7:
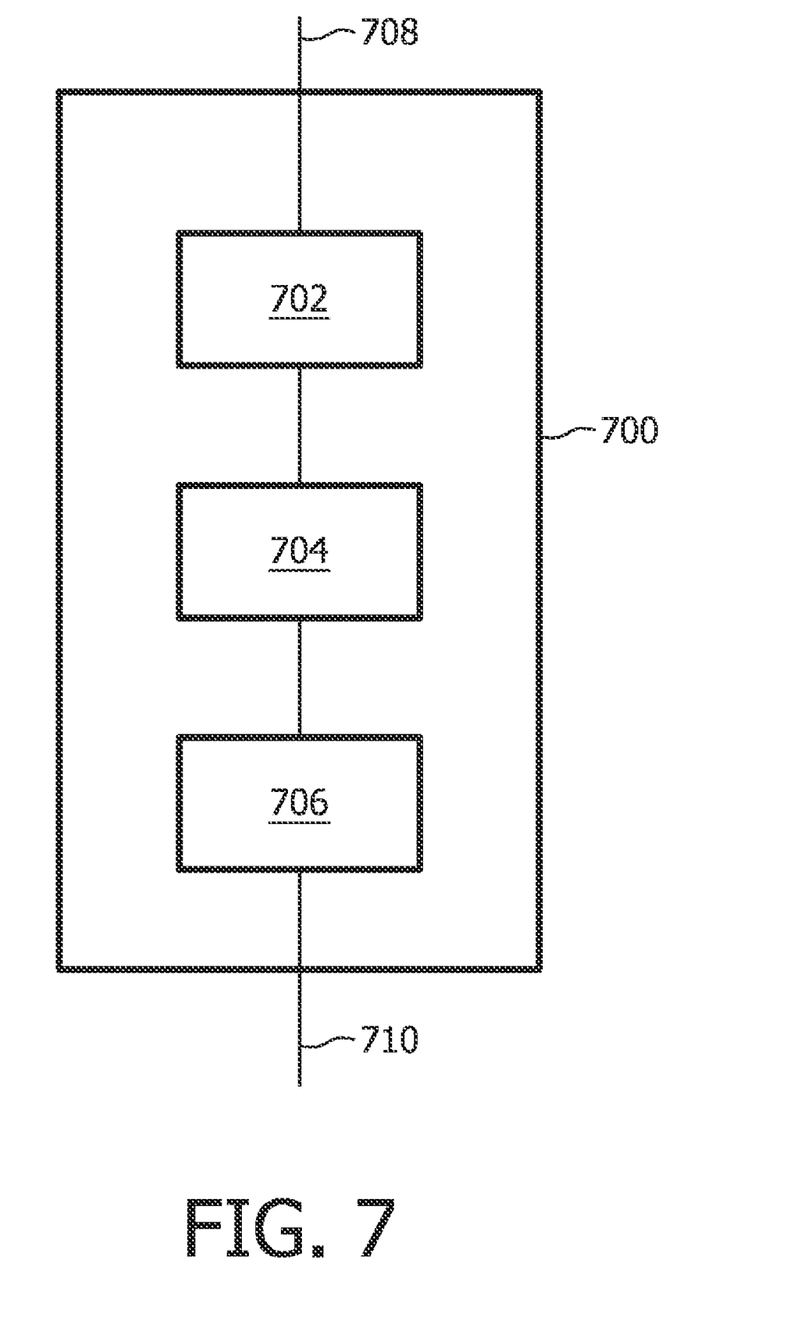
FIG. 7 illustrates a diagram of an embodiment of the invention.

An embodiment of the invention is illustrated in FIG. 7. Block 700 receives an input color 708 and transforms it into a reproduction color 710. In block 702 an extension direction is computed as set forth. In block 704, an intersection point with the input gamut boundary along the extension direction is determined, and an intersection point with the reproduction gamut boundary along the extension direction is determined. Using these intersection points and the distances between them, an amount of extension is computed as set forth. In block 706, the reproduction color is computed based on the input color, the extension direction, and the amount of extension. Block 700 can be used to compute values in a color look-up table. It can also be used, for example, to directly transform color values found in image or video data.

Although the embodiments have been elucidated for the example of a gamut extension, the embodiments may be adapted by a skilled person to realize a gamut narrowing rather than a gamut extension. Such a narrowing occurs, for example, when video data that was optimized for rendering on a wide-gamut display is rendered on a legacy CRT display that is not capable of rendering all colors in the video data. In that case, an inverse processing operation may be performed for a pleasing result on the legacy display.

The systems and methods set forth may be implemented in the hardware, firmware, or software drivers of a display such as a computer monitor, television set, or display of a handheld device (e.g. mobile phone, PDA), but may also be implemented as part of an image enhancement (software) package. The system may also be included in a video camera.

Figure 8:
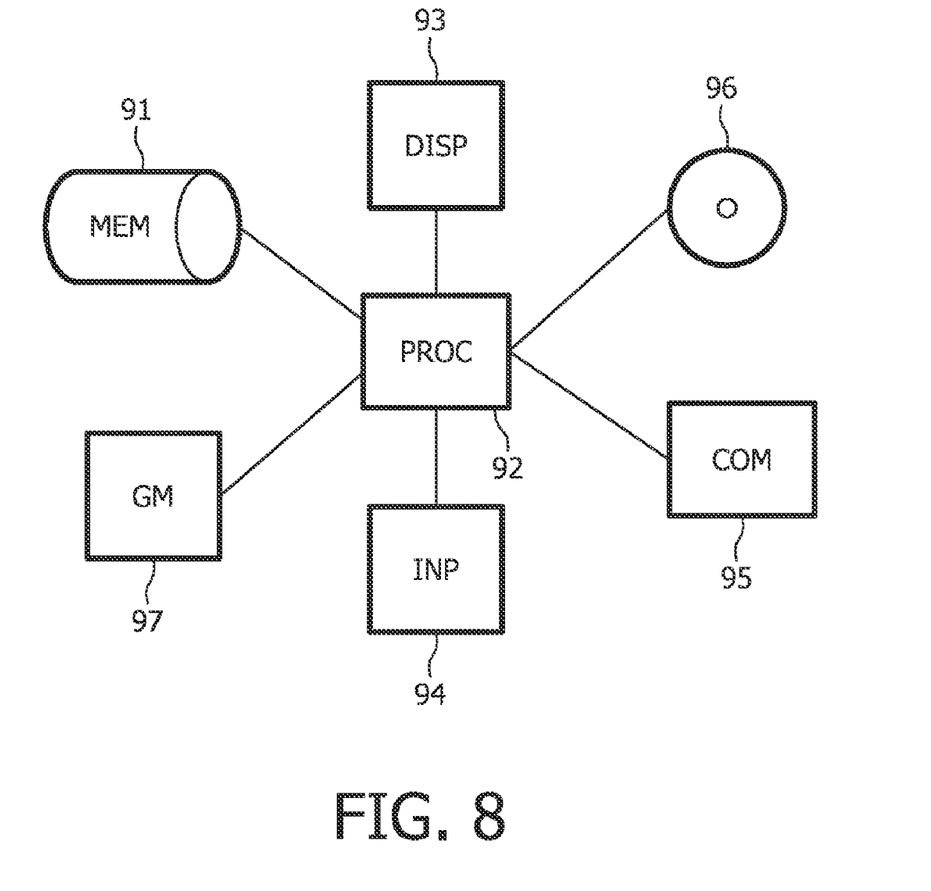
FIG. 8 illustrates a diagram of an embodiment of the invention.

FIG. 8 illustrates an embodiment of the invention. Such an embodiment may be realized in a computer monitor, television set, or display of a handheld device (e.g. mobile phone, PDA). The Figure shows a communication port 95 such as a connection to the Internet for connecting with a provider of digital content. Communication port 95 may also be connected to an antenna, satellite receiver, or cable television network. The content can also be obtained from a medium 96 such as a DVD or CD. The content comprises color image and/or color video data. The content received via port 95 or medium 96 is processed by processor 92. Means 97 is a unit comprising hardware and/or software elements arranged for transforming colors in the received digital content from a first gamut to a second gamut that corresponds to the capabilities of display 93. This may be realized for example by means of a look-up table stored in memory 91. Processor 92 controls the data flow and may be arranged to perform instructions stored in means 97. The result is shown to a user using display 93. Display 93 for example comprises an LED backlight and/or is capable of rendering more than three primaries. A user input 94 may be provided to obtain commands from a user to select content to be rendered.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. The carrier may be any entity or device capable of carrying the program. For example, the carrier may include a storage medium, such as a ROM, for example a CD ROM or a semiconductor ROM, or a magnetic recording medium, for example a floppy disc or hard disk. Further the carrier may be a transmissible carrier such as an electrical or optical signal, which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. Although gamut extension has been discussed in detail in the embodiments, it should be noted that it is clear to the skilled person how to adapt the embodiments to obtain a gamut compression.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system (600) for performing at least one of gamut compression and gamut extension by:
   transforming an input color (608) of an input image defined within a first gamut (102) into a reproduction color (610) of an output image for rendering by a reproduction device capable of rendering colors within a second gamut (104) different from the first gamut, the input color having an input chromaticity ($C_i$) and an input lightness ($L_i^*$) together forming an input point (202) in a chromaticity-lightness plane, the reproduction color having a reproduction chromaticity and a reproduction lightness together forming a reproduction point (210) in the chromaticity-lightness plane, wherein an absolute difference between the input lightness and the output lightness is a decreasing function of at least the chromaticity, and an absolute difference between the input chromaticity and the output chromaticity is an increasing function of at least the chromaticity, wherein an angle ($\theta$) between a positive chromaticity axis of the chromaticity-lightness plane and a line connecting the input point and the reproduction point is a continuous function of at least the input chromaticity.

2. The system according to claim 1, wherein the angle is a monotonically increasing and continuous function of at least the input lightness.

3. The system according to claim 2, wherein the angle is a piecewise linear function of at least the input lightness.

4. The system according to claim 1, wherein the second gamut comprises colors not included in the first gamut, and the reproduction chromaticity is equal to or larger than the input chromaticity.

5. The system according to claim 1, wherein the angle is within a range of $-\beta$ to $+\beta$, wherein $\beta$ is a predetermined positive value of at most 90 degrees.

6. The system according to claim 1, wherein an absolute value of the angle is a monotonically decreasing function of at least the input chromaticity.

7. The system according to claim 1, wherein the angle is an at least piecewise linear function of at least the input chromaticity.

8. The system according to claim 2, wherein the angle depends on a product of a function of the chromaticity and a function of the lightness.

9. The system according to claim 1, wherein the angle is zero for an upper range of chromaticity values within the input gamut.

10. The system according to claim 2, wherein an input chromaticity value exists for which it holds that the angle is zero for a predetermined lightness value, the angle is negative for input lightness values below the predetermined lightness value, and the angle is positive for input lightness values above the predetermined lightness value.

11. The system according to claim 1, wherein a distance between the input point and the reproduction point is an increasing function of at least the input chromaticity.

12. The system according to claim 11, wherein the distance depends on an exponential function of the chromaticity.

13. The system according to claim 11, wherein the distance depends on a further distance between an intersection point of the line connecting the input point and the reproduction point with the input gamut boundary and an intersection point of that line with the reproduction gamut boundary.

14. The system according to claim 1, wherein the input gamut is a gamut of colors that have a representation in a home television broadcast signal.

15. The system according to claim 1, wherein the input color has an input hue and the reproduction color has a reproduction hue, the input hue and the reproduction hue being essentially the same.

16. The system according to claim 1, comprising a color look-up table for mapping predetermined input colors to predetermined reproduction colors, and means for looking up the reproduction color corresponding to the input color in the look-up table.

17. The system according to claim 16, wherein the input colors and/or the reproduction colors are represented in the look-up table using an RGB coordinate space.

18. A method of performing at least one of gamut compression and gamut extension by:
transforming an input color (608) of an input image defined within a first gamut (102) into a reproduction color (610) of an output image for rendering by a reproduction device capable of rendering colors within a second gamut (104) different from the first gamut, the input color having an input chromaticity ($C_i$) and an input lightness ($L_i^*$) together forming an input point (202) in a chromaticity-lightness plane, the reproduction color having a reproduction chromaticity and a reproduction lightness together forming a reproduction point (210) in the chromaticity-lightness plane, wherein an absolute difference between the input lightness and the output lightness is a decreasing function of at least the chromaticity, and an absolute difference between the input chromaticity and the output chromaticity is an increasing function of at least the chromaticity, wherein an angle ($\theta$) between a positive chromaticity axis of the chromaticity-lightness plane and a line connecting the input point and the reproduction point is a continuous function of at least the input chromaticity.

19. A computer program product comprising instructions stored in a non-transitory computer readable medium for causing a processor to perform at least one of gamut compression and gamut extension by:
transforming an input color (608) of an input image defined within a first gamut (102) into a reproduction color (610) of an output image for rendering by a reproduction device capable of rendering colors within a second gamut (104) different from the first gamut, the input color having an input chromaticity ($C_i$) and an input lightness ($L_i^*$) together forming an input point (202) in a chromaticity-lightness plane, the reproduction color having a reproduction chromaticity and a reproduction lightness together forming a reproduction point (210) in the chromaticity-lightness plane, wherein an absolute difference between the input lightness and the output lightness is a decreasing function of at least the chromaticity, and an absolute difference between the input chromaticity and the output chromaticity is an increasing function of at least the chromaticity, wherein an angle ($\theta$) between a positive chromaticity axis of the chromaticity-lightness plane and a line connecting the input point and the reproduction point is a continuous function of at least the input chromaticity v.

20. A look-up table for performing at least one of: gamut compression and gamut extension by:
mapping an input color (608) of an input image defined within a first gamut (102) to a reproduction color (610) of an output image for rendering by a reproduction device capable of rendering colors within a second gamut (104) different from the first gamut, the input color having an input chromaticity ($C_i$) and an input lightness ($L_i^*$) together forming an input point (202) in a chromaticity-lightness plane, the reproduction color having a reproduction chromaticity and a reproduction lightness together forming a reproduction point (210) in the chromaticity-lightness plane, wherein an absolute difference between the input lightness and the output lightness is a decreasing function of at least the chromaticity, and an absolute difference between the input chromaticity and the output chromaticity is an increasing function of at least the chromaticity, wherein an angle ($\theta$) between a positive chromaticity axis of the chromaticity-lightness plane and a line connecting the input point and the reproduction point is a continuous function of at least the input chromaticity.

21. A color television set comprising
an input (95,96) for receiving an input image having colors within a first gamut (102);
a display (93) for rendering an output image, where the display is capable of rendering colors within a second gamut (104) different from the first gamut; and
means (97) for performing at least one of gamut compression and gamut extension by transforming an input color (608) of the input image into a reproduction color (610) of the output image, the input color having an input chromaticity ($C_i$) and an input lightness ($L_i^*$) together forming an input point (202) in a chromaticity-lightness plane, the reproduction color having a reproduction chromaticity and a reproduction lightness together forming a reproduction point (210) in the chromaticity-lightness plane, wherein an absolute difference between the input lightness and the output lightness is a decreasing function of at least the chromaticity, and an absolute difference between the input chromaticity and the output chromaticity is an increasing function of at least the chromaticity, wherein an angle ($\theta$) between a positive chromaticity axis of the chromaticity-lightness plane and a line connecting the input point and the reproduction point is a continuous function of at least the input chromaticity.

22. The color television set according to claim 21, wherein the display (93) comprises an LED backlight.

23. The color television set according to claim 21, wherein the display (93) comprises means for rendering more than three primary colors.

24. A handheld device comprising
an input (95,96) for receiving an input image having colors within a first gamut (102);
a display (93) for rendering an output image, where the display is capable of rendering colors within a second gamut (104), where the first gamut comprises colors not included in the second gamut; and
means (97) for performing gamut compression by transforming an input color (608) of the input image into a reproduction color (610) of the output image, the input color having an input chromaticity ($C_i$) and an input lightness ($L_i^*$) together forming an input point (202) in a chromaticity-lightness plane, the reproduction color having a reproduction chromaticity and a reproduction lightness together forming a reproduction point (210) in the chromaticity-lightness plane, wherein an absolute difference between the input lightness and the output lightness is a decreasing function of at least the chromaticity, and an absolute difference between the input chromaticity and the output chromaticity is an increasing function of at least the chromaticity, wherein an angle ($\theta$) between a positive chromaticity axis of the chromaticity-lightness plane and a line connecting the input point and the reproduction point is a continuous function of at least the input chromaticity.

* * * * *